US011784381B1

(12) United States Patent
Zhou et al.

(10) Patent No.: US 11,784,381 B1
(45) Date of Patent: Oct. 10, 2023

(54) ENERGY STORAGE DEVICE AND ELECTRICAL APPARATUS

(71) Applicants: Shenzhen Hairun New Energy Technology Co., Ltd., Shenzhen Guangdong (CN); Xiamen Hithium Energy Storage Technology Co., Ltd., Fujian (CN)

(72) Inventors: Wenyang Zhou, Fujian (CN); Yongfeng Xiong, Fujian (CN); Ming Yang, Fujian (CN)

(73) Assignees: SHENZHEN HAIRUN NEW ENERGY TECHNOLOGY CO., LTD., Shenzhen (CN); XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/113,396

(22) Filed: Feb. 23, 2023

(30) Foreign Application Priority Data

Nov. 11, 2022 (CN) .......................... 202211414921.3

(51) Int. Cl.
*H01M 50/627* (2021.01)
*H01M 50/103* (2021.01)
(Continued)

(52) U.S. Cl.
CPC ....... *H01M 50/627* (2021.01); *H01M 50/103* (2021.01); *H01M 50/186* (2021.01); *H01M 50/533* (2021.01)

(58) Field of Classification Search
CPC .................................................. H01M 50/627
See application file for complete search history.

(56) References Cited

U.S. PATENT DOCUMENTS

| 2009/0311593 | A1 | 12/2009 | Park |
| 2019/0237743 | A1 | 8/2019 | Zhou et al. |
| 2022/0320642 | A1 | 10/2022 | Cai et al. |

FOREIGN PATENT DOCUMENTS

| CN | 206878046 U | 1/2018 |
| CN | 210073933 U | 2/2020 |

(Continued)

OTHER PUBLICATIONS

CN213401338translation (Year: 2023).*

(Continued)

*Primary Examiner* — Brian R Ohara
(74) *Attorney, Agent, or Firm* — Scully, Scott, Murphy & Presser, P.C.

(57) ABSTRACT

The present disclosure discloses an energy storage device and electrical appliance. The energy storage device includes a housing, an electrode assembly, a top cover, a lower plastic member, a connecting plate and an insulating adhesive sheet, wherein the housing is provided with an opening; the electrode assembly is accommodated in the housing; the top cover covers the opening and is provided with a liquid injection hole; the lower plastic member is arranged on a side of the top cover close to the electrode assembly, and has an liquid injection hole, and the through hole is in communication with the liquid injection hole; the connecting plate is arranged on a side of the lower plastic member towards the electrode assembly; the insulating adhesive sheet is attached to a side of the connecting plate towards the electrode assembly and covers the connecting plate and the through hole.

20 Claims, 3 Drawing Sheets

(51) Int. Cl.
   *H01M 50/186*  (2021.01)
   *H01M 50/533*  (2021.01)

(56)             References Cited

FOREIGN PATENT DOCUMENTS

| | | |
|---|---|---|
| CN | 213150888 U | 5/2021 |
| CN | 213401338 U | 6/2021 |
| CN | 215418522 U | 1/2022 |
| CN | 114497836 A | 5/2022 |
| CN | 216450732 U | 5/2022 |
| CN | 216450732 U | 6/2022 |
| CN | 216958265 U | 7/2022 |
| CN | 217086732 U | 7/2022 |
| CN | 217134507 U | 8/2022 |
| CN | 217361843 U | 9/2022 |
| CN | 217468721 U | 9/2022 |
| CN | 217641706 U | 10/2022 |
| EP | 3331051 A1 | 6/2018 |
| JP | 2022138491 A | 9/2022 |
| WO | 2018177137 A1 | 10/2018 |
| WO | 2022121244 A1 | 6/2022 |

OTHER PUBLICATIONS

Notification to Grant Patent Right for Invention of CN115579597 dated Jan. 18, 2023.
US 20220320642, A1, dated Oct. 6, 2022, Feb. 23, 2023.

\* cited by examiner

ENERGY STORAGE DEVICE AND ELECTRICAL APPARATUS

CROSS-REFERENCE TO RELATED APPLICATION

The present application is based on and claims the benefit of and priority to Chinese Patent Application No. 202211414921.3, filed on Nov. 11, 2022, the entire contents of which are incorporated herein by reference.

TECHNICAL FIELD

The present disclosure relates to the technical field of energy storage, and in particular to an energy storage device and an electrical apparatus.

BACKGROUND

Rechargeable batteries (such as lithium-ion batteries) as the common energy storage devices have advantages such as high energy density, high power density, repeated use and long storage time. In recent years, the rechargeable batteries have been widely used in electric vehicles such as electric vehicles and electric bicycles as well as large-sized and medium-sized electric apparatuses such as energy storage facilities.

At present, it is generally required that cells in the rechargeable batteries are filled with electrolyte.

It should be noted that the information disclosed in the background section as mentioned above is only intended to enhance understanding of the background of the present disclosure, and may include information that does not constitute the prior art known to those of ordinary skill in the art.

SUMMARY

A main object of the present disclosure is to provide an energy storage device, which has good fluidity when electrolyte is filled, and improves humidity uniformity of an electrode assembly.

In order to realize the object of the above application, the present disclosure employs a following technical solution:

According to one aspect of the present disclosure, an energy storage device is provided. The energy storage device includes:

a housing having an opening and accommodating electrolyte;

an electrode assembly accommodated in the housing;

a top cover covering the opening and provided with a liquid injection hole;

a lower plastic member having a through hole, wherein the lower plastic member is arranged on a side of the top cover close to the electrode assembly and includes a plurality of bosses arranged at intervals in a length direction of the lower plastic member, the plurality of bosses at least include a first boss and a second boss, the first boss and the second boss are respectively located on both ends of the lower plastic member in the length direction thereof, the plurality of bosses are located on a side of the lower plastic member towards the electrode assembly, and the through hole is in communication with the liquid injection hole;

a connecting plate arranged on the side of the lower plastic member towards the electrode assembly, wherein a gap is formed between at least a part of the connecting plate and the lower plastic member in a thickness direction of the connecting plate;

an insulating adhesive sheet attached to a side of the connecting plate towards the electrode assembly and covering the connecting plate and the through hole;

wherein a notch is provided on a side of each of the first boss and the second boss close to the connecting plate, and the notch includes a first arc segment, a second arc segment, a third arc segment and a fourth arc segment which are sequentially arranged in a width direction of the lower plastic member; the first arc segment is connected with the second arc segment, the third arc segment is connected with the fourth arc segment, the second arc segment is connected with the third arc segment, the first arc segment is closer to the through hole than the second arc segment, the fourth arc segment is closer to the through hole than the third arc segment, and the first arc segment, the second arc segment, the third arc segment and the fourth arc segment form an edge of the notch; the insulating adhesive sheet, the connecting plate and the edge enclose to form a first flow channel for the electrolyte, and the electrolyte is injected through the liquid injection hole and flows towards the electrode assembly through the first flow channel.

According to the energy storage device provided by this embodiment, the gap is formed between the connecting plate and the lower plastic member, a notch is provided on a side of the boss close to the connecting plate, and the insulating adhesive sheet covers the connecting plate and the through hole, so that the insulating adhesive sheet, the connecting plate and the edge enclose to form the first flow channel for electrolyte; when the electrolyte is injected into the housing through the liquid injection hole, the insulating adhesive sheet covers the connecting plate and the through hole, so that the electrolyte flows along the gaps between the insulating adhesive sheet and the connecting plate and the lower plastic member, and then may flow out through the notch of the boss and then to the electrode assembly, thereby realizing the diversion of the electrolyte, and enabling the electrolyte to adequately flow to various parts of the electrode assembly. The edge of the notch is formed by the first arc segment, the second arc segment, the third arc segment and the fourth arc segment, so that a corner of the notch of the boss is rounded, and when the electrolyte flows through the notch, a flow rate of the electrolyte at the corner of the notch is faster, so that the electrolyte can flow into the electrode assembly more quickly and smoothly. Meanwhile, the corner of the notch is provided as a rounded corner, which can prevent the corner of the notch from scratching the tab and improve the reliability of the energy storage device.

According to an embodiment of the present disclosure, a reinforcing rib extending towards the electrode assembly is formed on either side of the lower plastic member in the width direction of the lower plastic member, a gap is formed between the connecting plate and the reinforcing rib in the width direction of the lower plastic member, and a gap is formed between at least a part of the insulating adhesive sheet located on the connecting plate and the reinforcing rib in the width direction of the lower plastic member; the insulating adhesive sheet, the connecting plate and the reinforcing rib enclose to form a second flow channel for the electrolyte, and the electrolyte is injected through the liquid injection hole and flows towards the electrode assembly through the second flow channel.

According to the energy storage device provided by this embodiment, the insulating adhesive sheet, the connecting plate and the reinforcing rib enclose to form the second flow channel for electrolyte, when the electrolyte is injected into the housing through the liquid injection hole, the insulating adhesive sheet covers the connecting plate and the through hole, so that the electrolyte flows along the gap between the insulating adhesive sheet and the connecting plate and the lower plastic member, and then may flow out through the gap between the connecting plate and the reinforcing rib and then to the electrode assembly, thereby realizing the diversion of the electrolyte, and the second flow channel is cooperated with the first flow channel, so that the electrolyte can adequately flow to various parts of the electrode assembly.

According to an embodiment of the present disclosure, the connecting plate includes a pole connecting portion, a transition portion and two tab connecting portions, and the pole connecting portion is connected with the two tab connecting portions through the transition portion; each of the two tab connecting portions is located on a side of the transition portion away from the notch, and the two tab connecting portions are distributed at an interval in a width direction of the connecting plate, the through hole is located between the two tab connecting portions, and the insulating adhesive sheet completely covers an area between the two tab connecting portions.

According to the energy storage device provided by this embodiment, the through hole is located between the two tab connecting portions, and the insulating adhesive sheet completely covers the area between the two tab connecting portions, so that the electrolyte flowing through the through hole flows towards the gap between the connecting plate and the lower plastic member under a flow-guiding action of the insulating adhesive sheet, and then flows into the electrode assembly through the first flow channel and the second flow channel.

According to an embodiment of the present disclosure, the connecting plate further includes a protrusion, the protrusion is located at a side of the transition portion towards the notch, and at least a part of the protrusion is located in the notch.

According to the energy storage device provided by this embodiment, the protrusion is provided. When the connecting plate is laser welded with a pole through a pole connecting portion, the protrusion is conducive to abut a welding nozzle for laser welding against a side edge of the connecting plate on which the protrusion is provided, and the notch provides an avoidance space for the welding nozzle to abut against the protrusion, to improve the stability of laser welding between the connecting plate and the pole, and improve the efficiency and yield of laser welding between the connecting plate and the pole; after the connecting plate is connected and energized with the pole, the protrusion can provide an additional current flow path when the current is too large, to improve the current carrying capacity of the connecting plate, and improve the stability and safety of the energy storage device.

According to an embodiment of the present disclosure, a gap is formed between the transition portion and the boss in the length direction of the lower plastic member, and the insulating adhesive sheet covers the gap.

According to the energy storage device provided by this embodiment, the gap is arranged between the transition portion and the boss, and the insulating adhesive sheet covers the gap, so that the electrolyte of the first flow channel flows into the electrode assembly through the notch. In addition, when the insulating adhesive sheet covers the gap, at least a part of the insulating adhesive sheet covers the edge of the boss, which can prevent the edge of the boss from scratching the tab.

According to an embodiment of the present disclosure, in the length direction of the lower plastic member, the insulating adhesive sheet covers the protrusion and at least a part of the notch.

According to the energy storage device provided by this embodiment, the protrusion is covered by the insulating adhesive sheet, and the insulating adhesive sheet completely covers the connecting plate, to form an insulation effect of the connecting plate, so as to avoid the connecting plate from contacting with the pole piece in the main body and thus cause the short circuit. Meanwhile, the insulating adhesive sheet covers at least a part of the gap, so that the electrolyte needs to flow out of the gap through the first arc segment and the fourth arc segment, and a flow rate of the electrolyte is relatively increased through the first arc segment and the fourth arc segment.

According to an embodiment of the present disclosure, at least a part of the insulating adhesive sheet covers a side of the boss towards the electrode assembly.

According to the energy storage device provided by this embodiment, at least a part of the insulating adhesive sheet covers a side of the boss towards the electrode assembly, so that the insulating adhesive sheet covers the gap between the transition portion and the boss and a part of the notch. This can improve the adhesive force of the insulating adhesive sheet and prevent the insulating adhesive sheet from falling off.

According to an embodiment of the present disclosure, the electrode assembly includes a main body and a tab connected to the main body, the tab is connected with the connecting plate, and the insulating adhesive sheet completely covers the tab and covers at least a part of the main body.

According to the energy storage device provided by this embodiment, the insulating adhesive sheet completely covers the connecting plate and the tab, to prevent welding slags from falling into the main body so as to cause short circuit, and improve the stability between the tab and the connecting plate after they are welded.

According to an embodiment of the present disclosure, the insulating adhesive sheet includes a plurality of insulating adhesive sub-sheets, and an overlapped area is formed between the insulating adhesive sub-sheets adjacent to one another.

According to the energy storage device provided by this embodiment, the plurality of insulating adhesive sub-sheets cover different areas of the connecting plate, the tab and the first main body respectively, and an overlapped area is formed between the insulating adhesive sub-sheets adjacent to one another. This can reduce the process difficulty of adhering the insulating adhesive sheets, improve the adhering strength of the insulating adhesive sheets in different areas, and reduce the manufacturing difficulty and cost of the insulating adhesive sheets.

According to an embodiment of the present disclosure, the notch further includes at least one of a first straight segment, a second straight segment and a third straight segment, wherein the first straight segment is connected between the first arc segment and the second arc segment, the second straight segment is connected between the third arc segment and the fourth arc segment, and the third straight segment is connected between the second arc segment and the third arc segment.

According to the energy storage device provided by this embodiment, the first straight segment is connected between the first arc segment and the second arc segment, the second straight segment is connected between the third arc segment and the fourth arc segment, and the third straight segment is connected between the second arc segment and the third arc segment, so that a corner of the notch is rounded, thereby improving a flow rate of electrolyte.

According to an embodiment of the present disclosure, a radian of the first arc segment is π/3 to π/2, and/or a radian of the fourth arc segment is π/3 to π/2.

According to the energy storage device provided by this embodiment, the radian of the first arc segment is π/3 to π/2, which can facilitate providing the flow of electrolyte at the first arc segment and facilitate the formation of the notch; and the radian of the first arc segment is π/3 to π/2, which can facilitate providing the flow of electrolyte at the fourth arc segment and facilitating the formation of the notch.

According to an embodiment of the present disclosure, an arc radius of the first arc segment is 1 mm to 3 mm, and/or an arc radius of the fourth arc segment is 1 mm to 3 mm.

According to the energy storage device provided by this embodiment, the arc radius of the first arc segment is 1 mm to 3 mm, to ensure that the first arc segment can meet the requirement of increasing a flow rate of electrolyte; and the arc radius of the fourth arc segment is 1 mm to 3 mm, to ensure that the fourth arc segment can meet the requirement of increasing the flow rate of electrolyte.

According to an embodiment of the present disclosure, a radian of the second arc segment is π/3 to π/2, and/or a radian of the third arc segment is π/3 to π/2.

According to the energy storage device provided by this embodiment, the radian of the second arc segment is π/3 to π/2, which facilitates providing the flow of electrolyte at the second arc segment and facilitates the formation of the notch; and the radian of the second arc segment is π/3 to π/2, which facilitates providing the flow of electrolyte at the third arc segment and facilitates the formation of the notch. Of course, the radian of the third arc segment may also be less than π/3 or more than π/2, which is not limited in the present disclosure.

According to an embodiment of the present disclosure, an arc radius of the second arc segment is 1 mm to 3 mm, and/or an arc radius of the third arc segment is 1 mm to 3 mm.

According to the energy storage device provided by this embodiment, the arc radius of the second arc segment is 1 mm to 3 mm, to ensure that the second arc segment can meet the requirement of increasing a flow rate of electrolyte; and the arc radius of the third arc segment is 1 mm to 3 mm, to ensure that the second arc segment can meet the requirement of increasing the flow rate of electrolyte.

According to an embodiment of the present disclosure, in the width direction of the lower plastic member, a width of the notch is 40% to 60% of a width of the boss.

According to the energy storage device provided by this embodiment, the width of the notch is 40% to 60% of the width of the boss. This can ensure that there is enough gap between the notch and the protrusion, facilitate the electrolyte to flow, facilitate a welding nozzle to abut on the connecting plate, and form enough avoidance space.

According to an embodiment of the present disclosure, in the width direction of the lower plastic member, the width of the notch is 25 mm to 30 mm.

According to the energy storage device provided by this embodiment, the width of the notch is 25 mm to 30 mm. This can ensure that there is enough gap between the notch and the protrusion, facilitate the flow of electrolyte, facilitate the welding nozzle to abut on the connecting plate, and form enough avoidance space.

According to an embodiment of the present disclosure, in the length direction of the lower plastic member, a depth of the notch is 20%-30% of a length of the boss.

According to the energy storage device provided by this embodiment, the depth of the notch is 20%-30% of the length of the boss, to ensure that there is enough gap between the first notch and the first protrusion, facilitate the flow of electrolyte, facilitate the welding nozzle to abut on the connecting plate, and form enough avoidance space.

According to an embodiment of the present disclosure, in the length direction of the lower plastic member, a depth of the notch is 3 mm to 6 mm.

According to the energy storage device provided by this embodiment, the depth of the notch is 3 mm to 6 mm, to ensure that there is enough gap between the notch and the protrusion, facilitate the flow of electrolyte, facilitate the welding nozzle to abut on the connecting plate, and form enough avoidance space.

According to an embodiment of the present disclosure, the notch further includes a first straight segment, a second straight segment and a third straight segment, wherein the first straight segment is connected between the first arc segment and the second arc segment, the second straight segment is connected between the third arc segment and the fourth arc segment, and the third straight segment is connected between the second arc segment and the third arc segment;

the protrusion includes a top surface towards the notch, and a first side surface and a second side surface located on both sides of the top surface in the width direction of the connecting plate, wherein the top surface is arranged opposite to the third straight segment and a first preset gap is formed therebetween, the first side surface is arranged opposite to the first straight segment and a second preset gap is formed therebetween, and the second side surface is arranged opposite to the second straight segment and a third preset gap is formed therebetween; the first preset gap is 2 mm to 5 mm, the second preset gap is 3 mm to 10 mm, and the third preset gap is 3 mm to 10 mm.

According to the energy storage device provided by this embodiment, the preset gap is formed between side walls of the protrusion and the first notch, which are opposite to each other, and an outlet of the first flow channel is formed between the first protrusion and the first notch, so that the electrolyte can flow into the main body through the first flow channel.

According to the other aspect of the present disclosure, an electrical appliance is provided. The electrical appliance includes the above-mentioned energy storage device.

According to the electrical appliance provided by this embodiment, a gap is formed between the connecting plate and the lower plastic member in the energy storage device, a notch is provided on a side of the boss close to the connecting plate, and the insulating adhesive sheet covers the connecting plate and the through hole, so that the insulating adhesive sheet, the connecting plate and the edge enclose to form a first flow channel for electrolyte; when the electrolyte is injected into the housing through the liquid injection hole, the insulating adhesive sheet covers the connecting plate and the through hole, so that the electrolyte flows along the gap between the insulating adhesive sheet and the connecting plate and the lower plastic member, and then flow out through the notch of the boss and then to the electrode assembly, thereby realizing the diversion of the electrolyte, and enabling the electrolyte to adequately flow to various parts of the electrode assembly. The edge of the notch is formed by the first arc segment, the second arc segment, the third arc segment and the fourth arc segment, so that a corner of the notch of the boss is rounded, and when the electrolyte flows through the notch, a flow rate of the electrolyte at the corner of the notch is faster, so that the electrolyte can flow into the electrode assembly more quickly and smoothly. Meanwhile, the corner of the notch is provided as a rounded corner, to prevent the corner of the notch from scratching the tab, improve the reliability of the energy storage device, and improve the reliability of the electrical appliance.

It should be understood that the above general description and the following detailed description are exemplary and explanatory only, rather than limitation of the present disclosure.

BRIEF DESCRIPTION OF THE DRAWINGS

The above and other features and advantages of the present disclosure will become more apparent by describing the exemplary embodiments thereof in detail with reference to the accompanying drawings.

Figure 1:
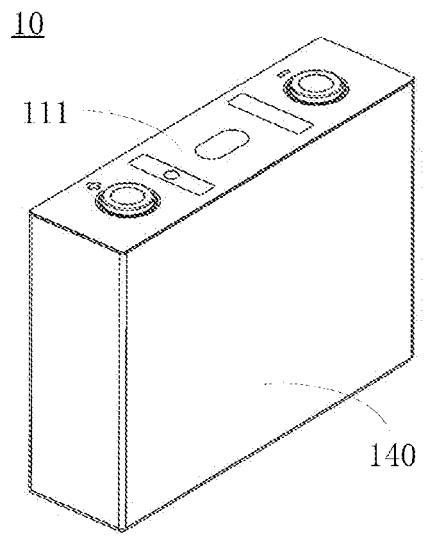
FIG. 1 is a schematic view of an energy storage device provided by an embodiment of the present disclosure.

| List of Reference Numbers: | | | |
|---|---|---|---|
| 10 | Energy Storage Device | | |
| 111 | Top Cover | 112 | Lower Plastic Member |
| 1120 | Boss | 1121 | First Boss |
| 1122 | Second Boss | 113 | Notch |
| 1131 | First Notch | 1132 | Second Notch |
| 1141 | First Arc Segment | 1142 | Second Arc Segment |
| 1143 | Third Arc Segment | 1144 | Fourth Arc Segment |
| 1145 | First Straight Segment | 1146 | Second Straight Segment |
| 1147 | Third Straight Segment | 115 | Pole |
| 1151 | First Pole | 1152 | Second Pole |
| 1160 | Explosion-proof Valve | 1170 | Liquid Injection Hole |
| 1180 | Through Hole | 1190 | Reinforcing Rib |
| 120 | Connecting Plate | 121 | First Connecting Plate |
| 1211 | First Transition Portion | 1212 | First Tab connecting Portion |
| 1213 | First Protrusion | 1214 | First Pole connecting Portion |
| 122 | Second Connecting Plate | 1221 | Second Transition Portion |
| 1222 | Second Tab connecting Portion | 1223 | Second Protrusion |
| 1224 | Second Pole connecting Portion | | |
| 130 | Electrode Assembly | 1310 | First Main Body |
| 1311 | First Main Body First Tab | 1312 | First Main Body Second Tab |
| 1320 | Second Main Body | 1321 | Second Main Body First Tab |
| 1322 | Second Main Body Second Tab | | |
| 140 | Housing | | |
| 150 | Insulating Adhesive Sheet | 151 | First Insulating Adhesive Sheet |
| 152 | Second Insulating Adhesive Sheet | | |
| 20 | Vehicle | | |

DETAILED DESCRIPTION

Example embodiments will now be described more comprehensively with reference to the accompanying drawings. However, the example embodiments can be implemented in various forms and should not be construed as being limited to the embodiments set forth herein; on the contrary, these embodiments are provided so that the present disclosure will be thorough and complete, and will fully convey the concept of example embodiments to those skilled in the art. The same reference numbers in the drawings indicate the same or similar structures, and thus the detailed description thereof will be omitted.

First, an embodiment of the present disclosure provides an energy storage device. As shown in FIGS. 1-7, the energy storage device 10 includes a housing 140, an electrode assembly 130, a top cover 111, a lower plastic member 112 (which may be made of plastic, for example), a connecting plate 120 and an insulating adhesive sheet 150. The housing 140 has an opening for accommodating electrolyte. The electrode assembly 130 is accommodated in the housing 140. The top cover 111 covers the opening of the housing 140, and has a liquid injection hole 1170. The lower plastic member 112 has a through hole 1180. The lower plastic member 112 is arranged on a side of the top cover 111 close to the electrode assembly 130. The lower plastic member 112 is provided with a plurality of bosses 1120 at intervals along a length direction X of the lower plastic member 112. The bosses 1120 at least include a first boss 1121 and a second boss 1122, which are respectively located at both ends of the lower plastic member 112 in the length direction X. The bosses 1120 are located at a side of the lower plastic member 112 towards the electrode assembly 130. The through hole 1180 is in communication with the liquid injection hole 1170. The connecting plate 120 is arranged on the side of the lower plastic member 112 towards the electrode assembly 130; and in a thickness direction of the connecting plate 120, a gap is formed between at least a part of the lower connecting plate 120 and the lower plastic member 112. The insulating adhesive sheet 150 is attached to a side of the connecting plate 120 towards the electrode assembly 130, and covers the connecting plate 120 and the through hole 1180.

A notch 113 is provided on a side of each of the first boss 1121 and the second boss 1122 close to the connecting plate 120. The notch 113 includes a first arc segment 1141, a second arc segment 1142, a third arc segment 1143 and a fourth arc segment 1144, which are sequentially arranged along a width direction of the lower plastic member 112. The first arc segment 1141 is connected with the second arc segment 1142, the third arc segment 1143 is connected with the fourth arc segment 1144, the second arc segment 1142 is connected with the third arc segment 1143, the first arc segment 1141 is closer to the through hole 1180 than the second arc segment 1142, and the fourth arc segment 1144 is closer to the through hole 1180 than the third arc segment 1143. The first arc segment 1141, the second arc segment 1142, the third arc segment 1143 and the fourth arc segment 1144 form an edge of the notch 113. The insulating adhesive sheet 150, the connecting plate 120 and the edge enclose to form a first flow channel for electrolyte, and the electrolyte flows into the liquid injection hole 1170 and can flow to the electrode assembly 130 through the first flow channel.

According to the energy storage device provided by the present disclosure, a gap is formed between the connecting plate 120 and the lower plastic member 112, a notch 113 is provided on a side of the boss 1120 close to the connecting plate 120, and the insulating adhesive sheet 150 covers the connecting plate 120 and the through hole 1180, so that the insulating adhesive sheet 150, the connecting plate 120 and the edge enclose to form a first flow channel for electrolyte. When the electrolyte is injected into the housing 140 through the liquid injection hole 1170, the insulating adhesive sheet 150 covers the connecting plate 120 and the through hole 1180, so that the electrolyte flows along the gap between the insulating adhesive sheet 150 and the connecting plate 120 and the lower plastic member 112, and then flow out through the notch 113 of the boss 1120, and then flows to the electrode assembly 130, thereby realizing the diversion of the electrolyte, and enabling the electrolyte to adequately flow to various parts of the electrode assembly 130, improving humidity uniformity of the electrode assembly 130. The edge of the notch 113 is formed by the first arc segment 1141, the second arc segment 1142, the third arc segment 1143 and the fourth arc segment 1144, so that a corner of the notch 113 of the boss 1120 is rounded. When the electrolyte flows through the notch 113, a flow rate of the electrolyte at the corner of the notch 113 is faster, so that the electrolyte can flow into the electrode assembly 130 more quickly and smoothly. Meanwhile, the corner of the notch 113 is provided as a rounded corner, which can prevent the corner of the notch 113 from scratching the tab and improve the reliability of the energy storage device.

Figure 2:
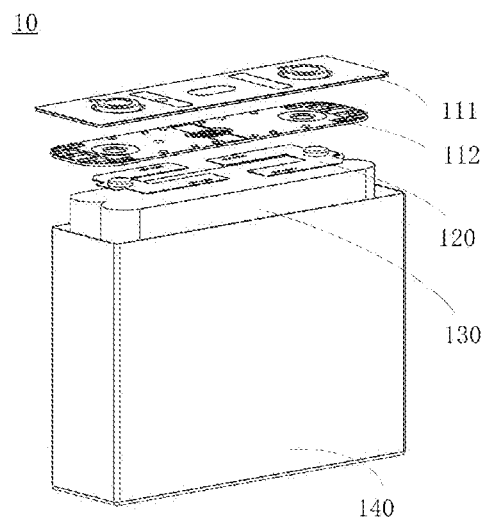
FIG. 2 is an explosive view of the energy storage device provided by an embodiment of the present disclosure.
Figure 3:
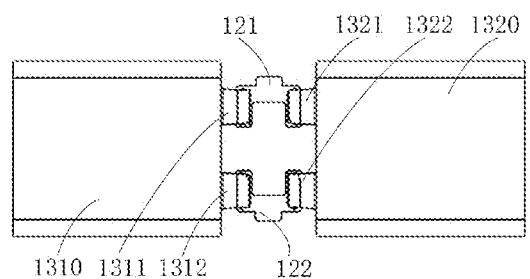
FIG. 3 is a schematic view of connection between the electrode assembly and the connecting plate provided by an embodiment of the present disclosure.

Specifically, as shown in FIGS. 2 and 3, the electrode assembly 130 includes a main body, a first tab and a second tab, one of the first tab and the second tab is a positive tab, and the other thereof is a negative tab. The main body is a winding main body, and the electrode assembly 130 includes a first main body 1310 and a second main body 1320, which are stacked in the thickness direction Z and placed in the housing 140. The first main body 1310 is connected with a first main body first tab 1311 (hereinafter referred to as "first tab 1311") and a first main body second tab 1312 (hereinafter referred to as "second tab 1312"). The second main body 1320 is connected with a second main body first tab 1321 (hereinafter referred to as "first tab 1321") and a second main body second tab 1322 (hereinafter referred to as "second tab 1322"). Of course, the electrode assembly 130 may also be a single main body, or formed by combining three, four or more main bodies, which is not limited in the present disclosure.

Figure 5:
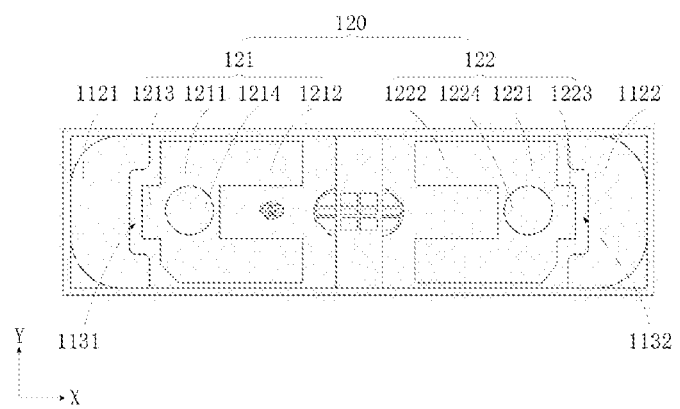
FIG. 5 is a schematic view of a lower plastic member and a connecting plate provided by an embodiment of the present disclosure.
Figure 6:
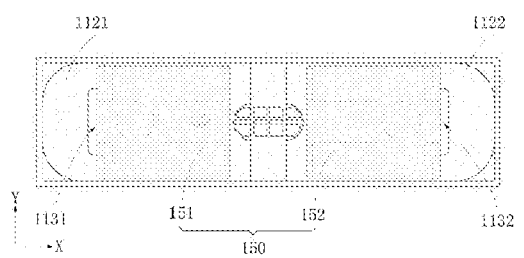
FIG. 6 is a schematic view of an insulating adhesive sheet and a connecting plate provided by an embodiment of the present disclosure.
Figure 7:
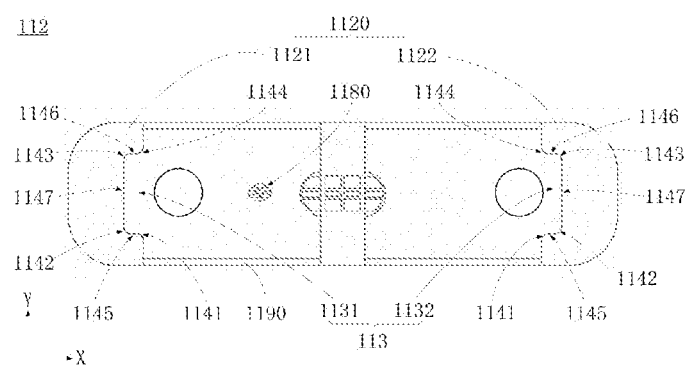
FIG. 7 is a schematic view of a lower plastic member provided by an embodiment of the present disclosure.

Specifically, as shown in FIGS. 5-7, two bosses 1120, i.e., a first boss 1121 and a second boss 1122, are formed on both ends of the lower plastic member 112 in the length direction X. The first boss 1121 is provided with a first notch 1131, the second boss 1122 is provided with a second notch 1132, and the first notch 1131 and the second notch 1132 are opened opposite to each other. When the top cover 111 blocks the opening of the housing 140, the first boss 1121 and the second boss 1122 extend into the opening and abut against a side wall of the opening of the housing 140, to form guidance and limitation for the top cover 111 to be installed on the opening of the housing 140, so that the top cover 111 may be quickly positioned and installed on the housing 140, thereby improving the installation efficiency of the top cover 111 and the housing 140; and the boss 1120 abuts against a main body in the housing 140 to fix the main body.

Specifically, as shown in FIGS. 2-5, the top cover 111 is provided with two poles 115, i.e., a first pole 1151 and a second pole 1152. The energy storage device 10 includes two connecting plates 120, i.e., a first connecting plate 121 and a second connecting plate 122. The first connecting plate 121 is located at a side close to the first boss 1121, and the second connecting plate 122 is located at a side close to the second boss 1122.

Hereinafter, specific structures of the lower plastic member 112 and the connecting plate 120 in the present disclosure will be illustrated by taking a specific matching structure of the first connecting plate 121 and the lower plastic member 112, and a specific matching structure of the second connecting plate 122 and the lower plastic member 112 as an example.

In an embodiment of the present disclosure, as shown in FIGS. 5-8, a side of the first boss 1121 close to the first connecting plate 121 is provided with a first notch 1131, and the first notch 1131 includes a first arc segment 1141, a second arc segment 1142, a third arc segment 1143, a fourth arc segment 1144, which are sequentially arranged along the width direction Y of the lower plastic member 112. The first arc segment 1141 is connected with the second arc segment 1142, the third arc segment 1143 is connected with the fourth arc segment 1144, the second arc segment 1142 is connected with the third arc segment 1143; the first arc segment 1141 is closer to the through hole 1180 than the second arc segment 1142, and the fourth arc segment 1144 is closer to the through hole 1180 than the third arc segment 1143. The first arc segment 1141, the second arc segment 1142, the third arc segment 1143, the fourth arc segment 1144 form the edge of the first notch 1131. The first insulating adhesive sheet 151, the first connecting plate 121 and the first edge enclose to form a first flow channel for electrolyte. A gap is formed between the first connecting plate 121 and the lower plastic member 112, a side of the first boss 1121 close to the first connecting plate 121 is provided with a first notch 1131, and the first insulating adhesive sheet 151 covers the first connecting plate 121 and the through hole 1180, so that the first insulating adhesive sheet 151, the first connecting plate 121 and the first edge enclose to form a first flow channel for electrolyte. When the electrolyte is injected into the housing 140 through the liquid injection hole 1170, the first insulating adhesive sheet 151 covers the first connecting plate 121 and the through hole 1180, so that the electrolyte flows along the gap between the first insulating adhesive sheet 151 and the first connecting plate 121 and the lower plastic member 112, and then flow out through the first notch 1131 of the first boss 1121, and then flows to the electrode assembly 130, thereby realizing the diversion of the electrolyte, and enabling the electrolyte to adequately flow to various parts of the electrode assembly 130.

A reinforcing rib 1190 extending towards a side of the electrode assembly 130 is provided on either side of the lower plastic member 112 in the width direction Y. A gap is formed between the first connecting plate 121 and the reinforcing rib 1190 in the width direction of the lower plastic member 112, and a gap is formed between at least a part of the first insulating adhesive sheet 151 located on the first transition portion 1211 and the reinforcing rib 1190 in the width direction Y of the lower plastic member 112. The first insulating adhesive sheet 151, the first connecting plate 121 and the reinforcing rib 1190 enclose to form a second flow channel for electrolyte, and the electrolyte is injected through the liquid injection hole 1170 and flows to the electrode assembly 130 through the second flow channel. With the second channel of electrolyte enclosed by the first insulating adhesive sheet 151, the first connecting plate 121 and the reinforcing rib 1190, when the electrolyte is injected into the housing 140 through the liquid injection hole 1170, the first insulating adhesive sheet 151 covers the first connecting plate 121 and the through hole 1180, so that the electrolyte flows along the gap between the first insulating adhesive sheet 151 and the first connecting plate 121 and the lower plastic member 112, and then flows out through the gap between the first connecting plate 121 and the reinforcing rib 1190, and then flows to the electrode assembly 130, thereby realizing the diversion of the electrolyte, and the second flow channel is matched with the first flow channel, enabling the electrolyte to adequately flow to various parts of the electrode assembly 130.

As shown in FIGS. 5-8, the first connecting plate 121 includes a first pole connecting portion 1214, a first transition portion 1211 and two first tab connecting portions 1212. The first pole connecting portion 1214 is connected with the two first tab connecting portions 1212 through the first transition portion 1211. The two first tab connecting portions 1212 are located at a side of the first transition portion 1211 away from the first notch 1131, and the two first tab connecting portions 1212 are spaced apart in the width direction of the first connecting plate 121. The through hole 1180 is located between the two first tab connecting portions 1212. The first insulating adhesive sheet 151 completely covers an area between the two first tab connecting portions 1212. Because the through hole 1180 is located between the two first tab connecting portions 1212, and the first insulating adhesive sheet 151 completely covers the area between the two first tab connecting portions 1212, the electrolyte flowing through the through hole 1180 flows towards the gap between the first connecting plate 121 and the lower plastic member 112 under the flow-guiding action of the first insulating adhesive sheet 151, and then flows into the electrode assembly 130 through the first flow channel and the second flow channel.

Figure 8:
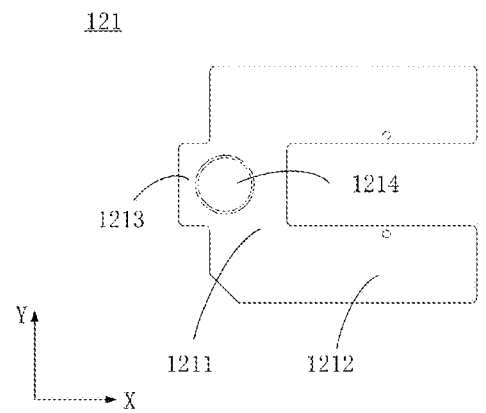
FIG. 8 is a schematic view of a first connecting plate provided by an embodiment of the present disclosure.

Further, as shown in FIGS. 5 and 8, the first connecting plate 121 further includes a first protrusion 1213. The first protrusion 1213 is located on a side of the first transition portion 1211 towards the first notch 1131, and at least a part of the first protrusion 1213 is located in the first notch 1131. By providing the first protrusion 1213, when the first connecting plate 121 is laser welded to the first pole 1151 through the first pole connecting portion 1214, the first protrusion 1213 in conducive to abut a welding nozzle (for example, a copper nozzle) for laser welding against a side edge of the first connecting plate 121 on which the first protrusion 1213 is provided, and the first notch 1131 provides an avoidance space for the welding nozzle to abut against the first protrusion 1213. This can improve the stability of laser welding between the first connecting plate 121 and the first pole 1151, and improve the efficiency and yield of laser welding between the first connecting plate 121 and the first pole 1151. After the first connecting plate 121 is connected and conducted with the first pole 1151, the first protrusion 1213 can provide an additional current flow path when the current is too large, to improve the current carrying capacity of the first connecting plate 121, and improve the stability and safety of the energy storage device.

As shown in FIGS. 5 and 6, in the length direction X of the lower plastic member 112, a gap is formed between the first transition portion 1211 and the first boss 1121, and the first insulating adhesive sheet 151 covers the gap. The gap is formed between the first transition portion 1211 and the first boss 1121 and the first insulating adhesive sheet 151 covering the gap, so that the electrolyte of the first flow channel flows into the electrode assembly 130 through the first notch 1131. In addition, when the first insulating adhesive sheet 151 covers the gap, at least a part of the first insulating adhesive sheet 151 covers the edge of the first boss 1121, which can prevent the edge of the first boss 1121 from scratching the tab.

As shown in FIG. 6, in the length direction X of the lower plastic member 112, the first insulating adhesive sheet 151 covers the first protrusion 1213 and at least a part of the first notch 1131. The first insulating adhesive sheet 151 covers the first boss, and the first insulating adhesive sheet 151 completely covers the first connecting plate 121, thereby forming the insulation function of the first connecting plate 121, and avoiding the short circuit caused by the contact between the first connecting plate 121 and a pole piece in the main body. Meanwhile, the first insulating adhesive sheet 151 covers at least a part of the first notch 1131, so that the electrolyte needs to flow out of the first notch 1131 through the first arc segment 1141 and the fourth arc segment 1144, and the flow rate of the electrolyte is relatively increased through the first arc segment 1141 and the fourth arc segment 1144.

As shown in FIG. 6, at least a part of the first insulating adhesive sheet 151 covers on a side of the first boss 1121 towards the electrode assembly 130. By at least a part of the first insulating adhesive sheet 151 covering on the side of the first boss 1121 towards the electrode assembly 130, when the first insulating adhesive sheet 151 covers a gap between the first transition portion 1211 and the first boss 1121 and a part of the first notch 1131, the adhesive force of the first insulating adhesive sheet 151 can be improved and the first insulating adhesive sheet 151 can be prevented from falling off.

The first insulating adhesive sheet 151 also covers at least a part of the first main body 1310 and the first tab 1311 connected to the first tab connecting portion 1212, and the first tab 1321 and at least a part of the second main body 1320. By the first insulating adhesive sheet 151 also covering at least a part of the first main body 1310 connected to the first tab connecting portion 1212 and the first tab 1311, and the first tab 1321 and at least a part of the second main body 1320, the first insulating adhesive sheet 151 completely covers the first connecting patch 121, the first tab 1311, and the first tab 1321, in order to avoid the short circuit caused by welding slag falling into the main body, and improve the stability of the first tab connecting portion 1212 and the first tab 1311 and the first tab 1321 after they are welded.

The first insulating adhesive sheet 151 is formed by connecting a plurality of insulating adhesive sub-sheets, and the insulating adhesive sub-sheets cover different areas of the first connecting plate 121, the first main body 1310, the first tab 1311, the second main body 1320 and the first tab 1321, respectively, and an overlapped area is formed between the insulating adhesive sub-sheets adjacent to one another. This can reduce the process difficulty of the first insulating adhesive sheet 151, improve the adhering strength of the first insulating adhesive sheet 151 in different areas, and reduce the manufacturing difficulty and cost of the first insulating adhesive sheet 151.

The first notch 1131 further includes at least one of a first straight segment 1145, a second straight segment 1146 and a third straight segment 1147. The first straight segment 1145 is connected between the first arc segment 1141 and the second arc segment 1142, the second straight segment 1146 is connected between the third arc segment 1143 and the fourth arc segment 1144, and the third straight segment 1147 is connected to the second arc segment 1142 and the third arc segment 1143. By the first straight segment 1145 being connected between the first arc segment 1141 and the second arc segment 1142, the second straight segment 1146 being connected between the third arc segment 1143 and the fourth arc segment 1144, and the third straight segment 1147 being connected between the second arc segment 1142 and the third arc segment 1143, a corner of the first notch 1131 is rounded, thereby increasing the flow rate of electrolyte passing therethrough.

An angle between the first straight segment 1145 and the third straight segment 1147 is an obtuse angle. By providing the angle between the first straight segment 1145 and the third straight segment 1147 as an obtuse angle, an opening of the first notch 1131 is relatively enlarged, which further facilitates the electrolyte to flow into the gap between the first protrusion 1213 and the first notch 1131, increases a radian of an corner of the first straight segment 1145 and the third straight segment 1147, and further increases the flow rate of the electrolyte at the first straight segment 1145 and the third straight segment 1147, so that the electrolyte can flow into the electrode assembly 130 faster. Of course, the angle between the first straight segment 1145 and the third straight segment 1147 may also be a right angle.

The angle between the second straight segment 1146 and the third straight segment 1147 is an obtuse angle. By providing the angle between the second straight segment 1146 and the third straight segment 1147 as an obtuse angle, the opening of the first notch 1131 is relatively enlarged, which further facilitates the electrolyte to flow into the gap between the first protrusion 1213 and the first notch 1131, increases a radian of a corner of the second straight segment 1146 and the third straight segment 1147, and further increases the flow rate of the electrolyte at the second straight segment 1146 and the third straight segment 1147, so that the electrolyte can flow into the electrode assembly 130 faster. Of course, the angle between the second straight segment 1146 and the third straight segment 1147 may also be a right angle.

A radian of the first arc segment 1141 is $\pi/3$ to $\pi/2$, for example, $\pi/3$, $5\pi/12$, $\pi/2$, etc. By providing the radian of the first arc segment 1141 as $\pi/3$ to $\pi/2$, it is beneficial to provide the flow of electrolyte at the first arc segment 1141 and facilitate the formation of the first notch 1131. Of course, the radian of the first arc segment 1141 may also be less than $\pi/3$ or more than $\pi/2$, which is not limited in the present disclosure.

A radian of the fourth arc segment 1144 is $\pi/3$ to $\pi/2$, for example, $\pi/3$, $5\pi/12$, $\pi/2$, etc. By providing the radian of the first arc segment 1141 as $\pi/3$ to $\pi/2$, it is beneficial to provide the flow of electrolyte at the fourth arc segment 1144 and facilitate the formation of the first notch 1131. Of course, the radian of the fourth arc segment 1144 may also be less than $\pi/3$ or more than $\pi/2$, which is not limited in the present disclosure. The radian of the first arc segment 1141 may be the same as or different from the radian of the fourth arc segment 1144.

An arc radius of the first arc segment 1141 is 1 mm to 3 mm, such as 1.0 mm, 1.5 mm, 2.0 mm, 2.5 mm, 3.0 mm, etc., which will not be listed exhaustively herein. By providing the arc radius of the first arc segment 1141 as 1 mm to 3 mm, it is ensured that the first arc segment 1141 can meet the requirement of increasing the flow rate of electrolyte. Of course, the arc radius of the first arc segment 1141 may be less than 1 mm or more than 3 mm.

The arc radius of the fourth arc segment 1144 is 1 mm to 3 mm, such as 1.0 mm, 1.5 mm, 2.0 mm, 2.5 mm, 3.0 mm, etc., which will not be listed exhaustively herein. By providing the arc radius of the fourth arc segment 1144 as 1 mm to 3 mm, it is ensured that the first arc segment 1141 can meet the requirement of increasing the flow rate of electrolyte. Of course, the arc radius of the fourth arc segment 1144 may be less than 1 mm or more than 3 mm. The arc radius of the first arc segment 1141 may be same as or different from the arc radius of the fourth arc segment 1144.

A radian of the second arc segment 1142 is $\pi/3$ to $\pi/2$, for example, $\pi/3$, $5\pi/12$, $\pi/2$, etc. By providing the radian of the second arc segment 1142 as $\pi/3$ to $\pi/2$, it is beneficial to provide the flow of electrolyte at the second arc segment 1142 and facilitate the formation of the first notch 1131. Of course, the radian of the second arc segment 1142 may also be less than $\pi/3$ or more than $\pi/2$, which is not limited in the present disclosure.

A radian of the third arc segment 1143 is $\pi/3$ to $\pi/2$, for example, $\pi/3$, $5\pi/12$, $\pi/2$, etc. By providing the radian of the third arc segment 1143 as $\pi/3$ to $\pi/2$, it is beneficial to provide the flow of electrolyte at the third arc segment 1143 and facilitate the formation of the first notch 1131. Of course, the radian of the third arc segment 1143 may also be less than $\pi/3$ or more than $\pi/2$, which is not limited in the present disclosure. The radian of the second arc segment 1142 may be the same as or different from that of the first arc segment 1141, the third arc segment 1143 and the fourth arc segment 1144.

The arc radius of the second arc segment 1142 is 1 mm to 3 mm, such as 1.0 mm, 1.5 mm, 2.0 mm, 2.5 mm, 3.0 mm, etc., which will not be listed exhaustively herein. By providing the arc radius of the second arc segment 1142 as 1 mm to 3 mm, it is ensured that the second arc segment 1142 can meet the requirement of increasing the flow rate of electrolyte. Of course, the arc radius of the second arc segment 1142 may be less than 1 mm or more than 3 mm.

An arc radius of the third arc segment 1143 is 1 mm to 3 mm, such as 1.0 mm, 1.5 mm, 2.0 mm, 2.5 mm, 3.0 mm, etc., which will not be listed exhaustively herein. By providing the arc radius of the third arc segment 1143 as 1 mm to 3 mm, it is ensured that the second arc segment 1142 can meet the requirement of increasing the flow rate of electrolyte. Of course, the arc radius of the third arc segment 1143 may be less than 1 mm or more than 3 mm. The arc radius of the second arc segment 1142 may be the same as or different from that of the first arc segment 1141, the third arc segment 1143 and the fourth arc segment 1144.

In the width direction of the lower plastic member 112, a width of the first notch 1131 is 40% to 60% of a width of the first boss 1121, such as 40%, 45%, 50%, 55%, 60%, etc., which will not be listed exhaustively herein. It is ensured that there is enough gap between the first notch 1131 and the first protrusion 1213, to facilitate flowing the electrolyte, facilitate the welding nozzle to abut on the first connecting plate 121, and form enough avoidance space. Of course, the width of the first notch 1131 may be less than 40% of the width of the first boss 1121 or more than 60% of the width of the first boss 1121, which is not limited in the present disclosure.

A length of the lower plastic member 112 may be 250 mm to 280 mm, such as 250 mm, 260.88 mm, 270 mm, 280 mm, etc. A width of the lower plastic member 112 may be 50 mm to 60 mm, such as 50 mm, 52 mm, 53 mm, 58.08 mm, 60 mm, etc. A maximum width of the first boss 1121 is same as the width of the lower plastic member 112, and a thickness of the first boss 1121 may be 2 mm to 3 mm, such as 2.0 mm, 2.2 mm, 2.58 mm, 2.8 mm, 3.0 mm, etc. A length of the first boss 1121 may be 15 mm to 25 mm, such as 15 mm, 18 mm, 20 mm, 22 mm and 25 mm, which is a maximum length of the first boss 1121.

A width of the first notch 1131 is 25 mm to 30 mm, for example, 25 mm, 26 mm, 27 mm, 28.13 mm, 29 mm and 30 mm, which will not be listed exhaustively in the present disclosure. When the first notch 1131 has a structure with an unequal width in a depth direction, the above width is the maximum width of the first notch 1131. It is ensured that there is enough gap between the first notch 1131 and the first protrusion 1213, to facilitate flowing the electrolyte, facilitate the welding nozzle to abut on the first connecting plate 121, and form enough avoidance space. Of course, the width of the first notch 1131 may be less than 25 mm or more than 30 mm, which is not limited in the present disclosure.

In the length direction X of the lower plastic member 112, a depth of the first notch 1131 is 20% to 30% of the length of the first boss 1121, such as 20%, 22%, 25%, 28%, 30%, etc., which will not be listed exhaustively herein. It is ensured that there is enough gap between the first notch 1131 and the first protrusion 1213, to facilitate flowing the electrolyte, facilitate the welding nozzle to abut on the first connecting plate 121, and form enough avoidance space. Of course, the depth of the first notch 1131 may be less than 20% of the length of the first boss 1121 or more than 30% of the length of the first boss 1121, which is not limited in the present disclosure.

The depth of the first notch 1131 is 3 mm to 6 mm, such as 3.0 mm, 3.5 mm, 4.0 mm, 4.5 mm, 5.0 mm, 5.5 mm and 6.0 mm, which will not be listed exhaustively herein. It is ensured that there is enough gap between the first notch 1131 and the first protrusion 1213, to facilitate flowing the electrolyte, facilitate the welding nozzle to abut on the first connecting plate 121, and form enough avoidance space. Of course, the depth of the first notch 1131 may also be less than 3 mm or more than 6 mm, which is not limited in the present disclosure.

For example, the first boss 1121 is symmetrical about a central axis of the lower plastic member 112 in the length direction X. By providing the first boss 1121 to be symmetrical about the central axis of the top cover 111 in the length direction X, the first boss 1121 has a symmetrical structure, the first notch 1131 has a symmetrical structure, the first arc segment 1141 and the fourth arc segment 1144 are symmetrical, and the second arc segment 1142 and the third arc segment 1143 are symmetrical, so that the electrolyte uniformly flows into the gap between the first protrusion 1213 and the first notch 1133 from both sides of the lower plastic member 112 in the width direction Y thereof, thereby further enabling the electrolyte to uniformly flow into the main body.

The first protrusion 1213 includes a top surface towards the first notch 1131, and a first side surface and a second side surface on both sides of the top surface in the width direction of the first connecting plate 121. The top surface, the first side surface and the second side surface each is a plane, the top surface is perpendicular to the length direction X of the lower plastic member 112, and an angle between the first side surface or the second side surface and the top surface is a right angle or an obtuse angle. When the angle between the side surface and the top surface of the first protrusion 1213 is a right angle, an orthogonal projection of the first protrusion 1213 on the lower plastic member 112 is rectangular; and when the angle between the side surface and the top surface of the first protrusion 1213 is an obtuse angle, the orthographic projection of the first protrusion 1213 on the lower plastic member 112 is trapezoidal. Of course, the angle between the side surface and the top surface of the first protrusion 1213 may also be an acute angle, and the first side surface and the second side surface of the first protrusion 1213 may also be an arc surface or a concave-convex surface, which is not limited in the present disclosure.

The top surface of the first protrusion 1213 is arranged opposite to the third straight line section 1147 and a first preset gap is formed therebetween, and the first preset gap is 2 mm to 5 mm, such as 2 mm, 3 mm, 4 mm, 5 mm, etc., which will not be listed exhaustively herein. The first side surface of the first protrusion 1213 is arranged opposite to the first straight segment 1145 and a second preset gap is formed therebetween, and the second preset gap is 3 mm to 10 mm, such as 3 mm, 5 mm, 8 mm, 10 mm, etc., which will not be listed exhaustively herein. The second side surface of the first protrusion 1213 is arranged opposite to the second straight segment 1146 and a third preset gap is formed therebetween, and the third preset gap is 3 mm to 10 mm, such as 3 mm, 5 mm, 8 mm, 10 mm, etc., which will not be listed exhaustively herein. By providing a preset gap between opposite side walls of the first protrusion 1213 and the first notch 1131, an outlet of the first flow channel is formed between the first protrusion 1213 and the first notch 1131, so that the electrolyte can flow into the main body through the first flow channel.

In the width direction Y of the first connecting plate 121, the width of the first protrusion 1213 is 20%-50% of the width of the first transition portion 1211, such as 20%, 25%, 30%, 35%, 40%, 45%, 50%, etc., which will not be listed exhaustively herein. The specific width of the first protrusion 1213 may be determined according to the specific size of the first connecting plate 121. By providing the width of the first protrusion 1213 as 20%-50% of the width of the first transition portion 1211, the first protrusion 1213 may have enough width to facilitate the abutting of the welding nozzle, so that the first protrusion 1213 can provide an additional current flow path; meanwhile, it can be avoided that the first notch 1131 is too wide to cause too small area of the first boss 1121. Of course, the width of the first protrusion 1213 may be less than 20% of the width of the first transition portion 1211, or the width of the first protrusion 1213 may be more than 50% of the width of the first transition portion 1211, which is not limited in the present disclosure.

In the length direction X of the first connecting plate 121, the length of the first protrusion 1213 is 10%-30% of the length of the first transition portion 1211, such as 10%, 15%, 20%, 25%, 30%, etc., which will not be listed exhaustively herein. The specific length of the first protrusion 1213 can be determined according to the specific size of the first connecting plate 121. By providing the length of the first protrusion 1213 as 10%-30% of the length of the first transition portion 1211, the first protrusion 1213 can have enough length, so that the abutting of the welding nozzle cannot be affected by a welding position of the first pole connecting portion 1214, and the first protrusion 1213 can provide an additional current flow path. Meanwhile, the first notch 1131 can be prevented from being too deep in the length direction X of the top cover 111.

The first protrusion 1213 is symmetrical about a central axis of the first connecting plate 121 in the length direction X, that is, in the width direction Y of the first connecting plate 121, the first protrusion 1213 is located at a middle position of the first connecting plate 121. The first pole connecting portion 1214 is located in a middle area of the first transition portion 1211, and the first protrusion 1213 is located in the middle position of the first connecting plate 121, so that the welding nozzle can be abut against the first connecting plate 121.

A shape of the first protrusion 1213 is matched with a shape of the first notch 1131. For example, the orthographic projections of the first protrusion 1213 and the first notch 1131 on the lower plastic member 112 are rectangular, or the orthographic projections of the first protrusion 1213 and the first notch 1131 on the lower plastic member 112 are trapezoidal. Of course, the shape of the first protrusion 1213 may not be matched with the shape of the first notch 1131, for example, the first protrusion 1213 is rectangular and the first notch 1131 is semicircular, which is not limited in the present disclosure.

In an embodiment of the present disclosure, as shown in FIGS. 5-7 and 9, a second notch 1132 is formed on a side of the second boss 1122 close to the second connecting plate 122, and the second notch 1132 includes a first arc segment 1141, a second arc segment 1142, a third arc segment 1143, a fourth arc segment 1144, which are sequentially arranged along the width direction Y of the lower plastic member 112. The first arc segment 1141 is connected with the second arc segment 1142, the third arc segment 1143 is connected with the fourth arc segment 1144, and the second arc segment 1142 is connected with the third arc segment 1143. The first arc segment 1141 is closer to the through hole 1180 than the second arc segment 1142, and the fourth arc segment 1144 is closer to the liquid injection hole 1170 than the third arc segment 1143. The first arc segment 1141, the second arc segment 1142, and the third arc segment 1143 and the fourth arc segment 1144 form a second edge of the second notch 1132. The second insulating adhesive sheet 152, the second connecting plate 122 and the second edge enclose to form a first flow channel for electrolyte. A gap is formed between the second connecting plate 122 and the lower plastic member 112, the second notch 1132 is formed on a side of the second boss 1122 close to the second connecting plate 122, and the second insulating adhesive sheet 152 covers the second connecting plate 122, so that the second insulating adhesive sheet 152, the second connecting plate 122 and the second edge enclose to form a first flow channel for electrolyte. When the electrolyte is injected into the housing 140 through the liquid injection hole 1170, a part of the electrolyte may flow along the gap between the second insulating adhesive sheet 152 and the second connecting plate 122 and the lower plastic member 112, and then flow out through the second notch 1132 of the second boss 1122, and then flow to the electrode assembly 130, thereby realizing the diversion of the electrolyte, and enabling the electrolyte to adequately flow to various parts of the electrode assembly 130.

The lower plastic member 112 has reinforcing ribs 1190 extending towards a side of the electrode assembly 130 on both sides thereof in the width direction Y. A gap is formed between the second connecting plate 122 and the reinforcing rib 1190 in the width direction Y of the lower plastic member 112, and a gap is formed between at least a part of the second insulating adhesive sheet 152 located on the second transition portion 1221 and the reinforcing rib 1190 in the width direction Y of the lower plastic member 112. The second insulating adhesive sheet 152, the second connecting plate 122 and the reinforcing rib 1190 enclose to form a second flow channel for electrolyte, and the electrolyte is injected through the liquid injection hole 1170 and flows to the electrode assembly 130 through the second flow channel. By the second insulating adhesive sheet 152, the second connecting plate 122 and the reinforcing rib 1190 enclosing to form the second channel of electrolyte, when the electrolyte is injected into the housing 140 through the liquid injection hole 1170, the second insulating adhesive sheet 152 covers the second connecting plate 122, so that a part of the electrolyte flows along the gap between the second insulating adhesive sheet 152 and the second connecting plate 122 and the lower plastic member 112, and then the electrolyte may flow out through the gap between the second connecting plate 122 and the reinforcing rib 1190, and then flow to the electrode assembly 130, thereby realizing the diversion of the electrolyte, and the second flow channel is matched with the first flow channel, so that the electrolyte can adequately flow to various parts of the electrode assembly 130.

Figure 9:
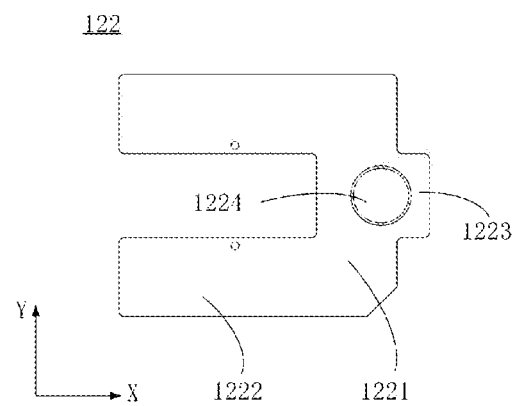
FIG. 9 is a schematic view of a second connecting plate provided by an embodiment of the present disclosure.

As shown in FIGS. 5 and 9, the second connecting plate 122 includes a second pole connecting portion 1224, a second transition portion 1221 and two second tab connecting portions 1222; and the second pole connecting portion 1224 is connected with the two second tab connecting portions 1222 through the second transition portion 1221. The second tab connecting portion 1222 is located on a side of the second transition portion 1221 away from the second notch 1132, and two second tab connecting portions 1222 are spaced apart in the width direction Y of the second connecting plate 122. The second insulating adhesive sheet 152 completely covers an area between the two second tab connecting portions 1222. By the second insulating adhesive sheet 152 completely covering the area between the two second tab connecting portions 1222, a part of the electrolyte flowing through the through hole 1180 flows towards the gap between the second connecting plate 122 and the lower plastic member 112 under the guidance of the second insulating adhesive sheet 152, and then flows into the electrode assembly 130 through the first and second flow channels.

Further, as shown in FIGS. 5 and 9, the second connecting plate 122 further includes a second protrusion 1223. The second protrusion 1223 is located on a side of the second transition portion 1221 towards the second notch 1132, and at least a part of the second protrusion 1223 is located in the second notch 1132. By providing the second protrusion 1223, when the second connecting plate 122 is laser welded to the second pole 1152 through the second pole connecting portion 1224, the second protrusion 1223 is conducive to abut a welding nozzle for laser welding against a side edge of the second connecting plate 122 on which the second protrusion 1223 is provided, and the second notch 132 provides an avoidance space for the welding nozzle to abut against the second protrusion 1223. This can improve the stability of laser welding between the second connecting plate 122 and the second pole 1152, and improve the efficiency and yield of laser welding between the second connecting plate 122 and the second pole 1152. After the second connecting plate 122 is connected and energized with the second pole 1152, the second protrusion 1223 can provide an additional current flow path when the current is too large, to improve the current carrying capacity of the second connecting plate 122, and improve the stability and safety of the energy storage device.

As shown in FIGS. 5 and 6, in the length direction X of the lower plastic member 112, a gap is formed between the second transition portion 1221 and the second boss 1122, and the second insulating adhesive sheet 152 covers the gap. The gap is formed between the second transition portion 1221 and the second boss 1122, and the second insulating adhesive sheet 152 covers the gap, so that the electrolyte of the first flow channel flows into the electrode assembly 130 through the second notch 1132. In addition, when the second insulating adhesive sheet 152 covers the gap, at least a part of the second insulating adhesive sheet 152 covers the edge of the second boss 1122, which can prevent the edge of the second boss 1122 from scratching the second tab.

As shown in FIG. 6, in the length direction X of the lower plastic member 112, the second insulating adhesive sheet 152 covers the second protrusion 1223 and at least a part of the second notch 1132. By the second insulating adhesive sheet 152 covering the second protrusion 1223, the second insulating adhesive sheet 152 completely covers the second connecting plate 122, to form the insulating function of the second connecting plate 122, thereby preventing the second connecting plate 122 from contacting with the pole piece in the main body to cause the short circuit. Meanwhile, by the second insulating adhesive sheet 152 covering at least a part of the second notch 1132, the electrolyte needs to flow out of the second notch 1132 through the first arc segment 1141 and the fourth arc segment 1144, and the flow rate of the electrolyte is relatively increased through the first arc segment 1141 and the fourth arc segment 1144.

As shown in FIG. 6, at least a part of the second insulating adhesive sheet 152 covers a side of the second boss 1122 towards the electrode assembly 130. By at least a part of the second insulating adhesive sheet 152 covering the side of the second boss 1122 towards the electrode assembly 130, when the second insulating adhesive sheet 152 covers the gap between the second transition portion 1221 and the second boss 1122 and a part of the second notch 1132, the adhesive force of the second insulating adhesive sheet 152 can be improved and the second insulating adhesive sheet 152 can be prevented from falling off.

The second insulating adhesive sheet 152 also covers at least a part of the first main body 1310 and the second tab 1312 connected to the second tab connecting portion 1222, and the second tab 1322 and at least a part of the second main body 1320. By the second insulating adhesive sheet 152 also covering at least a part of the first main body 1310 and the second tab 1312 connected to the second tab connecting portion 1222, and the second tab 1322 and at least a part of the second main body 1320, the second insulating adhesive sheet 152 completely covers the second connecting plate 122 and the first main body second tab 1312 and the second main body second tab 1322, to avoid welding slags from falling into the main body to cause the short circuit, and improve the stability between the first tab connecting portion 1212 and the first main body second tab 1312 and the second main body second tab 1322 after they are welded.

The second insulating adhesive sheet 152 is formed by connecting a plurality of insulating adhesive sub-sheets, and the insulating adhesive sub-sheets cover different areas of the second connecting plate 122, the first main body 1310, the first main body second tab 1312, the second main body 1320 and the second main body second tab 1322, respectively, and an overlapped area is formed between the insulating adhesive sub-sheets adjacent to one another. This can reduce the process difficulty of adhering the second insulating adhesive sheet 152, improve the adhering efficiency of the second insulating adhesive sheet 152 in different areas, and reduce the manufacturing difficulty and cost of the second insulating adhesive sheet 152.

The second notch 1132 further includes at least one of a first straight segment 1145, a second straight segment 1146 and a third straight segment 1147, wherein the first straight segment 1145 is connected between the first arc segment 1141 and the second arc segment 1142, the second straight segment 1146 is connected between the third arc segment 1143 and the fourth arc segment 1144, and the third straight segment 1147 is connected to the second arc segment 1142 and the third arc segment 1143. By connecting the first straight segment 1145 between the first arc segment 1141 and the second arc segment 1142, connecting the second straight segment 1146 between the third arc segment 1143 and the fourth arc segment 1144, and connecting the third straight segment 1147 between the second arc segment 1142 and the third arc segment 1143, a corner of the second notch 1132 is rounded, thereby increasing the flow rate of electrolyte passing therethrough.

An angle between the first straight segment 1145 and the third straight segment 1147 is an obtuse angle. By providing the angle between the first straight segment 1145 and the third straight segment 1147 as an obtuse angle, an opening of the second notch 1132 is relatively enlarged, thereby further facilitating the electrolyte to flow into the gap between the second protrusion 1223 and the second notch 1132, increasing a radian of a corner of the first straight segment 1145 and the third straight segment 1147, and further increasing the flow rate of the electrolyte at the first straight segment 1145 and the third straight segment 1147, so that the electrolyte can flow into the electrode assembly 130 faster. Of course, the angle between the first straight segment 1145 and the third straight segment 1147 may be a right angle.

An angle between the second straight segment 1146 and the third straight segment 1147 is an obtuse angle. By providing the angle between the second straight segment 1146 and the third straight segment 1147 as an obtuse angle, the opening of the second notch 1132 is relatively enlarged, further facilitating the electrolyte to flow into the gap between the second protrusion 1223 and the second notch 1132, increasing a radian of a corner of the second straight segment 1146 and the third straight segment 1147, and further increasing the flow rate of electrolyte at the second straight segment 1146 and the third straight segment 1147, so that the electrolyte can flow into the electrode assembly 130 faster. Of course, the angle between the second straight segment 1146 and the third straight segment 1147 may also be a right angle.

The radian of the first arc segment 1141 is $\pi/3$ to $\pi/2$, for example, $\pi/3$, $5\pi/12$, $\pi/2$, etc. By providing the radian of the first arc segment 1141 as $\pi/3$ to $\pi/2$, it is beneficial to provide the flow of electrolyte at the first arc segment 1141 and facilitate the formation of the second notch 1132. Of course, the radian of the first arc segment 1141 may also be less than $\pi/3$ or more than $\pi/2$, which is not limited in the present disclosure.

The radian of the fourth arc segment 1144 is $\pi/3$ to $\pi/2$, for example, $\pi/3$, $5\pi/12$, $\pi/2$, etc. By providing the radian of the first arc segment 1141 as $\pi/3$ to $\pi/2$, it is beneficial to provide the flow of electrolyte at the fourth arc segment 1144 and facilitate the formation of the second notch 1132. Of course, the radian of the fourth arc segment 1144 may also be less than $\pi/3$ or more than $\pi/2$, which is not limited in the present disclosure. The radian of the first arc segment 1141 may be the same as or different from the radian of the fourth arc segment 1144.

The arc radius of the first arc segment 1141 is 1 mm to 3 mm, such as 1.0 mm, 1.5 mm, 2.0 mm, 2.5 mm, 3.0 mm, etc., which will not be listed exhaustively herein. By providing the arc radius of the first arc segment 1141 as 1 mm to 3 mm, it is ensured that the first arc segment 1141 can meet the requirement of increasing the flow rate of electrolyte. Of course, the arc radius of the first arc segment 1141 may be less than 1 mm or more than 3 mm.

The arc radius of the fourth arc segment 1144 is 1 mm to 3 mm, such as 1.0 mm, 1.5 mm, 2.0 mm, 2.5 mm, 3.0 mm, etc., which will not be listed exhaustively herein. By providing the arc radius of the fourth arc segment 1144 as 1 mm to 3 mm, it is ensured that the first arc segment 1141 can meet the requirement of increasing the flow rate of electrolyte. Of course, the arc radius of the fourth arc segment 1144 may be less than 1 mm or more than 3 mm. The arc radius of the first arc segment 1141 may be same as or different from the arc radius of the fourth arc segment 1144.

The radian of the second arc segment 1142 is $\pi/3$ to $\pi/2$, for example, $\pi/3$, $5\pi/12$, $\pi/2$, etc. By providing the radian of the second arc segment 1142 as $\pi/3$ to $\pi/2$, it is beneficial to provide the flow of electrolyte at the second arc segment 1142 and facilitate the formation of the second notch 1132. Of course, the radian of the second arc segment 1142 may also be less than $\pi/3$ or more than $\pi/2$, which is not limited in the present disclosure.

The radian of the third arc segment 1143 is $\pi/3$ to $\pi/2$, for example, $\pi/3$, $5\pi/12$, $\pi/2$, etc. By providing the radian of the third arc segment 1143 as $\pi/3$ to $\pi/2$, it is beneficial to provide the flow of electrolyte at the third arc segment 1143 and facilitate the formation of the second notch 1132. Of course, the radian of the third arc segment 1143 may also be less than $\pi/3$ or more than $\pi/2$, which is not limited in the present disclosure. The radian of the second arc segment 1142 may be the same as or different from that of the first arc segment 1141, the third arc segment 1143 and the fourth arc segment 1144.

The arc radius of the second arc segment 1142 is 1 mm to 3 mm, such as 1.0 mm, 1.5 mm, 2.0 mm, 2.5 mm, 3.0 mm, etc., which will not be listed exhaustively herein. By providing the arc radius of the second arc segment 1142 as 1 mm to 3 mm, it is ensured that the second arc segment 1142 can meet the requirement of increasing the flow rate of electrolyte. Of course, the arc radius of the second arc segment 1142 may be less than 1 mm or more than 3 mm.

The arc radius of the third arc segment 1143 is 1 mm to 3 mm, such as 1.0 mm, 1.5 mm, 2.0 mm, 2.5 mm, 3.0 mm, etc., which will not be listed exhaustively herein. By providing the arc radius of the third arc segment 1143 as 1 mm to 3 mm, it is ensured that the second arc segment 1142 can meet the requirement of increasing the flow rate of electrolyte. Of course, the arc radius of the third arc segment 1143 may be less than 1 mm or more than 3 mm. The arc radius of the second arc segment 1142 may be the same as or different from that of the first arc segment 1141, the third arc segment 1143 and the fourth arc segment 1144.

In the width direction of the lower plastic member 112, a width of the second notch 1132 is 40% to 60% of a width of the second boss 1122, such as 40%, 45%, 50%, 55%, 60%, etc., which will not be listed exhaustively herein. It is ensured that there is enough gap between the second notch 1132 and the second protrusion 1223, which facilitates flowing the electrolyte, facilitates the welding nozzle to abut on the second connecting plate 122, and forms enough avoidance space. Of course, the width of the second notch 1132 may be less than 40% of the width of the second boss 1122 or more than 60% of the width of the second boss 1122, which is not limited in the present disclosure.

The length of the lower plastic member 112 may be 250 mm to 280 mm, such as 250 mm, 260.88 mm, 270 mm, 280 mm, etc. A width of the lower plastic member 112 may be 50 mm to 60 mm, such as 50 mm, 52 mm, 53 mm, 58.08 mm, 60 mm, etc. A maximum width of the second boss 1122 is same as the width of the lower plastic member 112, and a thickness of the second boss 1122 may be 2 mm to 3 mm, such as 2.0 mm, 2.2 mm, 2.58 mm, 2.8 mm, 3.0 mm, etc. A length of the second boss 1122 may be 15 mm to 25 mm, such as 15 mm, 18 mm, 20 mm, 22 mm and 25 mm, which is a maximum length of the second boss 1122.

A width of the second notch 1132 is 25 mm to 30 mm, such as 25 mm, 26 mm, 27 mm, 28.13 mm, 29 mm and 30 mm, which will not be listed exhaustively herein. When the second notch 1132 has a structure with an unequal width in a depth direction, the above width is the maximum width of the second notch 1132. It is ensured that there is enough gap between the second notch 1132 and the second protrusion 1223, which facilitates flowing the electrolyte, facilitates the welding nozzle to abut on the second connecting plate 122, and forms enough avoidance space. Of course, the width of the second notch 1132 may also be less than 25 mm or more than 30 mm, which is not limited in the present disclosure.

In the length direction X of the lower plastic member 112, a depth of the second notch 1132 is 20% to 30% of the length of the second boss 1122, such as 20%, 22%, 25%, 28%, 30%, etc., which will not be listed exhaustively herein. It is ensured that there is enough gap between the second notch 1132 and the second protrusion 1223, which facilitates flowing the electrolyte, facilitates the welding nozzle to abut on the second connecting plate 122, and forms enough avoidance space. Of course, the depth of the second notch 1132 may be less than 20% of the length of the second boss 1122 or more than 30% of the length of the second boss 1122, which is not limited in the present disclosure.

The depth of the second notch 1132 is 3 mm to 6 mm, such as 3.0 mm, 3.5 mm, 4.0 mm, 4.5 mm, 5.0 mm, 5.5 mm and 6.0 mm, which will not be listed exhaustively herein. It is ensured that there is enough gap between the second notch 1132 and the second protrusion 1223, which facilitates flowing the electrolyte, facilitates the welding nozzle to abut on the second connecting plate 122, and forms enough avoidance space. Of course, the depth of the second notch 1132 may also be less than 3 mm or more than 6 mm, which is not limited in the present disclosure.

The second boss 1122 is symmetrical about the central axis of the lower plastic member 112 in the length direction X. By providing the second boss 1122 to be symmetrical about the central axis of the top cover 111 in the length direction X, the second boss 1122 has a symmetrical structure, the second notch 1132 has a symmetrical structure, the first arc segment 1141 and the fourth arc segment 1144 are symmetrical, and the second arc segment 1142 and the third arc segment 1143 are symmetrical, so that the electrolyte uniformly flows into the gap between the second boss 1223 and the second notch 1133 from both sides of the lower plastic member 112 in the width direction Y thereof, thereby further enabling the electrolyte to uniformly flow into the main body.

The second protrusion 1223 includes a top surface towards the second notch 1132, and a first side surface and a second side surface located on both sides of the top surface in the width direction of the second connecting plate 122. The top surface, the first and second side surfaces each is a plane, the top surface is perpendicular to the length direction X of the lower plastic member 112, and an angle between the first side surface or the second side surface and the top surface is a right angle or an obtuse angle. When the angle between the side surface and the top surface of the second protrusion 1223 is a right angle, an orthographic projection of the second protrusion 1223 on the lower plastic member 112 is rectangular; and when the angle between the side surface and the top surface of the second protrusion 1223 is an obtuse angle, the orthographic projection of the second protrusion 1223 on the lower plastic member 112 is trapezoidal. Of course, the angle between the side surface and the top surface of the second protrusion 1223 may also be an acute angle, and the first side surface and the second side surface of the second protrusion 1223 may also be an arc surface or a concave-convex surface, which is not limited in the present disclosure.

The top surface of the second protrusion 1223 is arranged opposite to the third straight line section 1147 and a first preset gap is formed therebetween, and the first preset gap is 2 mm to 5 mm, such as 2 mm, 3 mm, 4 mm, 5 mm, etc., which will not be listed exhaustively herein. The first side surface of the second protrusion 1223 is arranged opposite to the first straight segment 1145 and a second preset gap is formed therebetween, and the second preset gap is 3 mm to 10 mm, such as 3 mm, 5 mm, 8 mm, 10 mm, etc., which will not be listed exhaustively herein. The second side surface of the second protrusion 1223 is arranged opposite to the second straight segment 1146 and a third preset gap is formed therebetween, and the third preset gap is 3 mm to 10 mm, such as 3 mm, 5 mm, 8 mm, 10 mm, etc., which will not be listed exhaustively herein. By providing a preset gap between opposite side walls of the second protrusion 1223 and the second notch 1132, an outlet of the first flow channel is formed between the second protrusion 1223 and the second notch 1132, so that the electrolyte can flow into the main body through the first flow channel.

In the width direction Y of the second connecting plate 122, the width of the second protrusion 1223 is 20%-50% of the width of the second transition portion 1221, such as 20%, 25%, 30%, 35%, 40%, 45%, 50%, etc., which will not be listed exhaustively herein. The specific width of the second protrusion 1223 may be determined according to the specific size of the second connecting plate 122. By providing the width of the second protrusion 1223 as 20%-50% of the width of the second transition portion 1221, the second protrusion 1223 can have enough width to facilitate the abutting of the welding nozzle, so that the second protrusion 1223 can provide an additional current flow path; meanwhile, it can be avoided that the second notch 1132 is too wide to cause too small area of the second boss 1122. Of course, the width of the second protrusion 1223 may be less than 20% of the width of the second transition portion 1221, or the width of the second protrusion 1223 may be more than 50% of the width of the second transition portion 1221, which is not limited in the present disclosure.

In the length direction X of the second connecting plate 122, the length of the second protrusion 1223 is 10%-30% of the length of the second transition portion 1221, such as 10%, 15%, 20%, 25%, 30%, etc., which will not be listed exhaustively herein. The specific length of the second protrusion 1223 may be determined according to the specific size of the second connecting plate 122. By providing the length of the second protrusion 1223 as 10%-30% of the length of the second transition portion 1221, the second protrusion 1223 may have enough length, so that the abutting of the welding nozzle cannot be affected by a welding position of the second pole connecting portion 1224, and the second protrusion 1223 can provide an additional current flow path. Meanwhile, the second notch 1132 can be prevented from being too deep in the length direction X of the top cover 111.

The second protrusion 1223 is symmetrical about a central axis of the second connecting plate 122 in the length direction X thereof, that is, in the width direction Y of the second connecting plate 122, the second protrusion 1223 is located at a middle position of the second connecting plate 122. The second pole connecting portion 1224 is located in a middle area of the second transition portion 1221, and the second protrusion 1223 is located in the middle position of the second connecting plate 122, so that the welding nozzle can be abut against the second connecting plate 122.

A shape of the second protrusion 1223 is matched with a shape of the second notch 1132. For example, the orthographic projection of the second protrusion 1223 and the second notch 1132 on the lower plastic member 112 each is rectangular, or the orthographic projection of the second protrusion 1223 and the second notch 1132 on the lower plastic member 112 each is trapezoidal. Of course, the shape of the second protrusion 1223 may not be matched with the shape of the second notch 1132, for example, the second protrusion 1223 is rectangular and the second notch 1132 is semicircular, which is not limited in the present disclosure.

As shown in FIG. 5, the first boss 1121 and the second boss 1122 are symmetrically arranged on the top cover 111, and the shapes and sizes of the first boss 1121 and the second boss 1122 may be completely the same.

Specifically, the first connecting plate 121 is a positive connecting plate, the first tab of the main body is a positive tab, and the first pole 1151 is a positive pole; and the second connecting plate 122 is a negative connecting plate, the second tab of the main body is a negative tab, and the second pole 1152 is a negative pole. Or, the first connecting plate 121 is a negative connecting plate, the first tab of the main body is a negative tab, and the first pole 1151 is a negative pole; and the second connecting plate 122 is a positive connecting plate, the second tab of main body is a positive tab, and the second pole 1152 is a positive pole.

The positive connecting plate may be made of an aluminum, and the negative connecting plate may be made of a copper.

As shown in FIG. 5, the first connecting plate 121 and the second connecting plate 122 may be symmetrically arranged on the top cover 111, and the shapes and sizes of the first connecting plate 121 and the second connecting plate 122 may be completely symmetrical. Of course, the structure of the first connecting plate 121 may be different from that of the second connecting plate 122, or only the structure of the second protrusion 1223 on the first connecting plate 121 is completely same as that of the second protrusion 1223 on the second connecting plate 122.

The first connecting plate 121 and the second connecting plate 122 may be respectively provided with a positioning hole or a positioning groove, and the lower plastic member 112 is provided with a positioning protrusion. By cooperating the positioning protrusion with the positioning hole or the positioning groove, the first connecting plate 121 and the second connecting plate 122 can be quickly positioned on the lower plastic member 112, and the position deviation of the first connecting plate 121 and the second connecting plate 122 on the lower plastic member 112 can be avoided.

The insulating adhesive sheet 150 is, for example, an insulating tape. Of course, the insulating adhesive sheet 150 may also be other functional films having adhesive and insulating functions, which will not be limited in the present disclosure.

Figure 4:
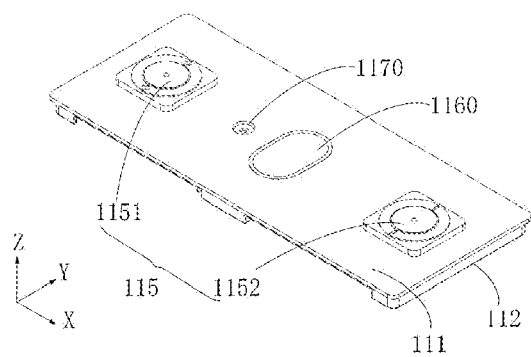
FIG. 4 is a schematic view of a top cover provided by an embodiment of the present disclosure.

Specifically, as shown in FIG. 4, the top cover 111 is further provided with an explosion-proof valve 1160, through which high-temperature and high-pressure gas generated in the housing 140 can be discharged in time.

The energy storage device provided in the present disclosure may be, for example, a single cell or a battery module including a plurality of single cells.

Figure 10:
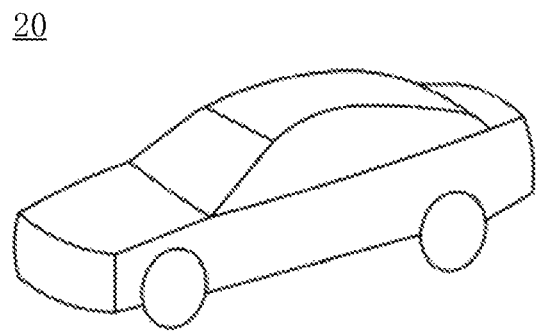
FIG. 10 is a schematic view of a vehicle provided by an embodiment of the present disclosure.

An embodiment of the present disclosure also provides an electric appliance including the above-mentioned energy storage device. The electric appliance may be, for example, a vehicle 20 shown in FIG. 10. According to the electric appliance provided by the present disclosure, a gap is formed between the connecting plate and the lower plastic member in the energy storage device, a notch is formed on a side of the boss close to the connecting plate, and the insulating adhesive sheet covers the connecting plate and the through hole, so that the insulating adhesive sheet, the connecting plate and the edge enclose to form a first flow channel for electrolyte. When the electrolyte is injected into the housing through the liquid injection hole, the insulating adhesive sheet covers the connecting plate and the through hole, so that the electrolyte flows along the gap between the insulating adhesive sheet and the connecting plate and the lower plastic member, and then the electrolyte may flow out through the notch of the boss, and then flow to the electrode assembly, thereby realizing the diversion of the electrolyte, and enabling the electrolyte to adequately flow to various parts of the electrode assembly. The edge of the notch is formed by the first arc segment, the second arc segment, the third arc segment and the fourth arc segment, so that the corner of the notch of the boss is rounded, when the electrolyte flows through the notch, the flow rate of the electrolyte at the corner of the notch is faster, so that the electrolyte can flow into the electrode assembly more quickly and smoothly; meanwhile, the corner of the notch is provided as a rounded corner, which can prevent the corner of the notch from scratching the tab, thereby improving the reliability of the energy storage device, and thus improving the reliability of the electrical appliance.

In the present disclosure embodiment, the term "a plurality" refers to two or more than two, unless otherwise explicitly defined. Terms such as "connection" should be understood broadly. For example, "connection" may refer to a fixed connection, a detachable connection, or an integral connection. For those of ordinary skill in the art, the specific meanings of the above terms in the embodiments of the present disclosure can be understood according to specific situations.

In the description of the embodiments of the present disclosure, it should be understood that directions or positional relationships indicated by the terms "upper" and "lower" are based on the directions or positional relationships shown in the drawings, only for the convenience of describing the embodiments of the present disclosure and simplifying the description, instead of indicating or implying that the referred devices or units must have a specific direction, be constructed and operated in a specific direction, and therefore, should not be understood as limitations on the embodiments of the present disclosure.

In the description of this specification, the term "an embodiment" means that a specific feature, structure, material or characteristic described in connection with this embodiment or example is included in at least one embodiment or example of the embodiments of the present disclosure. In this specification, the schematic expressions of the above terms do not necessarily refer to the same embodiment or example. Furthermore, the specific features, structures, materials or characteristics described may be combined in any one or more embodiments or examples in a suitable manner.

The above are only preferred embodiments of the present disclosure, and are not intended to limit the embodiments of the present disclosure. For those skilled in the art, the embodiments of the present disclosure can have various modifications and changes. Any modification, equivalent substitution, improvement, etc. made within the spirit and principle of the embodiments of the present disclosure shall be included in the protection scope of the present disclosure.

What is claimed is:

1. An energy storage device, comprising:
a housing having an opening and accommodating electrolyte;
an electrode assembly accommodated in the housing;
a top cover covering the opening and provided with a liquid injection hole;
a lower plastic member, having a through hole, wherein the lower plastic member is arranged on a side of the top cover close to the electrode assembly and includes a plurality of bosses arranged at intervals in a length direction of the lower plastic member, the plurality of bosses at least comprise a first boss and a second boss, the first boss and the second boss are respectively located on both ends of the lower plastic member in the length direction of the lower plastic member, the plurality of bosses are located on a side of the lower plastic member towards the electrode assembly, and the through hole is in communication with the liquid injection hole;
a connecting plate arranged on the side of the lower plastic member towards the electrode assembly, wherein a gap is formed between at least a part of the connecting plate and the lower plastic member in a thickness direction of the connecting plate;
an insulating adhesive sheet attached to a side of the connecting plate towards the electrode assembly and covering the connecting plate and the through hole;
wherein a notch is provided on a side of each of the first boss and the second boss close to the connecting plate, and the notch includes a first arc segment, a second arc segment, a third arc segment and a fourth arc segment sequentially arranged in a width direction of the lower plastic member; the first arc segment is connected with the second arc segment, the third arc segment is connected with the fourth arc segment, the second arc segment is connected with the third arc segment, the first arc segment is closer to the through hole than the second arc segment, the fourth arc segment is closer to the through hole than the third arc segment; and the first arc segment, the second arc segment, the third arc segment and the fourth arc segment form an edge of the notch; the insulating adhesive sheet, the connecting plate and the edge enclose to form a first flow channel for the electrolyte, and the electrolyte is injected through the liquid injection hole and flows towards the electrode assembly through the first flow channel.

2. The energy storage device according to claim 1, wherein a reinforcing rib extending towards the electrode assembly is formed on either side of the lower plastic member in the width direction of the lower plastic member, a gap is formed between the connecting plate and the reinforcing rib in the width direction of the lower plastic member, and a gap is formed between at least a part of the insulating adhesive sheet located on the connecting plate and the reinforcing rib in the width direction of the lower plastic member; the insulating adhesive sheet, the connecting plate and the reinforcing rib enclose to form a second flow channel for the electrolyte, and the electrolyte is injected through the liquid injection hole and flows towards the electrode assembly through the second flow channel.

3. The energy storage device according to claim 1, wherein the connecting plate comprises a pole connecting portion, a transition portion and two tab connecting portions, and the pole connecting portion is connected with the two tab connecting portions through the transition portion; each of the two tab connecting portions is located on a side of the transition portion away from the notch, and the two tab connecting portions are distributed at an interval in a width direction of the connecting plate, the through hole is located between the two tab connecting portions, and the insulating adhesive sheet completely covers an area between the two tab connecting portions.

4. The energy storage device according to claim 3, wherein the connecting plate further comprises a protrusion, the protrusion is located on a side of the transition portion towards the notch, and at least a part of the protrusion is located in the notch.

5. The energy storage device according to claim 4, wherein a gap is formed between the transition portion and the boss in the length direction of the lower plastic member, and the insulating adhesive sheet covers the gap.

6. The energy storage device according to claim 4, wherein the insulating adhesive sheet covers the protrusion and at least one portion of the notch in the length direction of the lower plastic member.

7. The energy storage device according to claim 6, wherein at least a part of the insulating adhesive sheet covers a side of the boss towards the electrode assembly.

8. The energy storage device according to claim 1, wherein the electrode assembly comprises a main body and a tab connected to the main body, the tab is connected with the connecting plate, and the insulating adhesive sheet completely covers the tab and covers at least a part of the main body.

9. The energy storage device according to claim 1, wherein the insulating adhesive sheet comprises a plurality of insulating adhesive sub-sheets, and an overlapped area is formed between the insulating adhesive sub-sheets adjacent to one another.

10. The energy storage device according to claim 1, wherein the notch further comprises at least one of a first straight segment, a second straight segment and a third straight segment, wherein the first straight segment is connected between the first arc segment and the second arc segment, the second straight segment is connected between the third arc segment and the fourth arc segment, and the third straight segment is connected between the second arc segment and the third arc segment.

11. The energy storage device according to claim 1, wherein a radian of the first arc segment is $\pi/3$ to $\pi/2$, and/or a radian of the fourth arc segment is $\pi/3$ to $\pi/2$.

12. The energy storage device according to claim 1, wherein an arc radius of the first arc segment is 1 mm to 3 mm, and/or an arc radius of the fourth arc segment is 1 mm to 3 mm.

13. The energy storage device according to claim 1, wherein a radian of the second arc segment is $\pi/3$ to $\pi/2$, and/or a radian of the third arc segment is $\pi/3$ to $\pi/2$.

14. The energy storage device according to claim 1, wherein an arc radius of the second arc segment is 1 mm to 3 mm, and/or an arc radius of the third arc segment is 1 mm to 3 mm.

15. The energy storage device according to claim 1, wherein in the width direction of the lower plastic member, a width of the notch is 40% to 60% of a width of the boss.

16. The energy storage device according to claim 1, wherein in the width direction of the lower plastic member, a width of the notch is 25 mm to 30 mm.

17. The energy storage device according to claim 1, wherein in the length direction of the lower plastic member, a depth of the notch is 20% to 30% of a length of the boss.

18. The energy storage device according to claim 1, wherein in the length direction of the lower plastic member, a depth of the notch is 3 mm to 6 mm.

19. The energy storage device according to claim 4, wherein the notch further comprises a first straight segment, a second straight segment and a third straight segment, wherein the first straight segment is connected between the first arc segment and the second arc segment, the second straight segment is connected between the third arc segment and the fourth arc segment, and the third straight segment is connected between the second arc segment and the third arc segment;

the protrusion comprises a top surface towards the notch, and a first side surface and a second side surface located on both sides of the top surface in the width direction of the connecting plate, wherein the top surface is arranged opposite to the third straight segment and a first preset gap is formed therebetween, the first side surface is arranged opposite to the first straight segment and a second preset gap is formed therebetween, and the second side surface is arranged opposite to the second straight segment and a third preset gap is formed therebetween; the first preset gap is 2 mm to 5 mm, the second preset gap is 3 mm to 10 mm, and the third preset gap is 3 mm to 10 mm.

20. An electrical appliance, comprising the energy storage device according to claim 1.

* * * * *